G. GULDBRANDSEN.
WEIGHT RECORDING MEANS FOR WEIGHING SCALES.
APPLICATION FILED APR. 16, 1908.
938,141.
Patented Oct. 26, 1909.
3 SHEETS—SHEET 1.
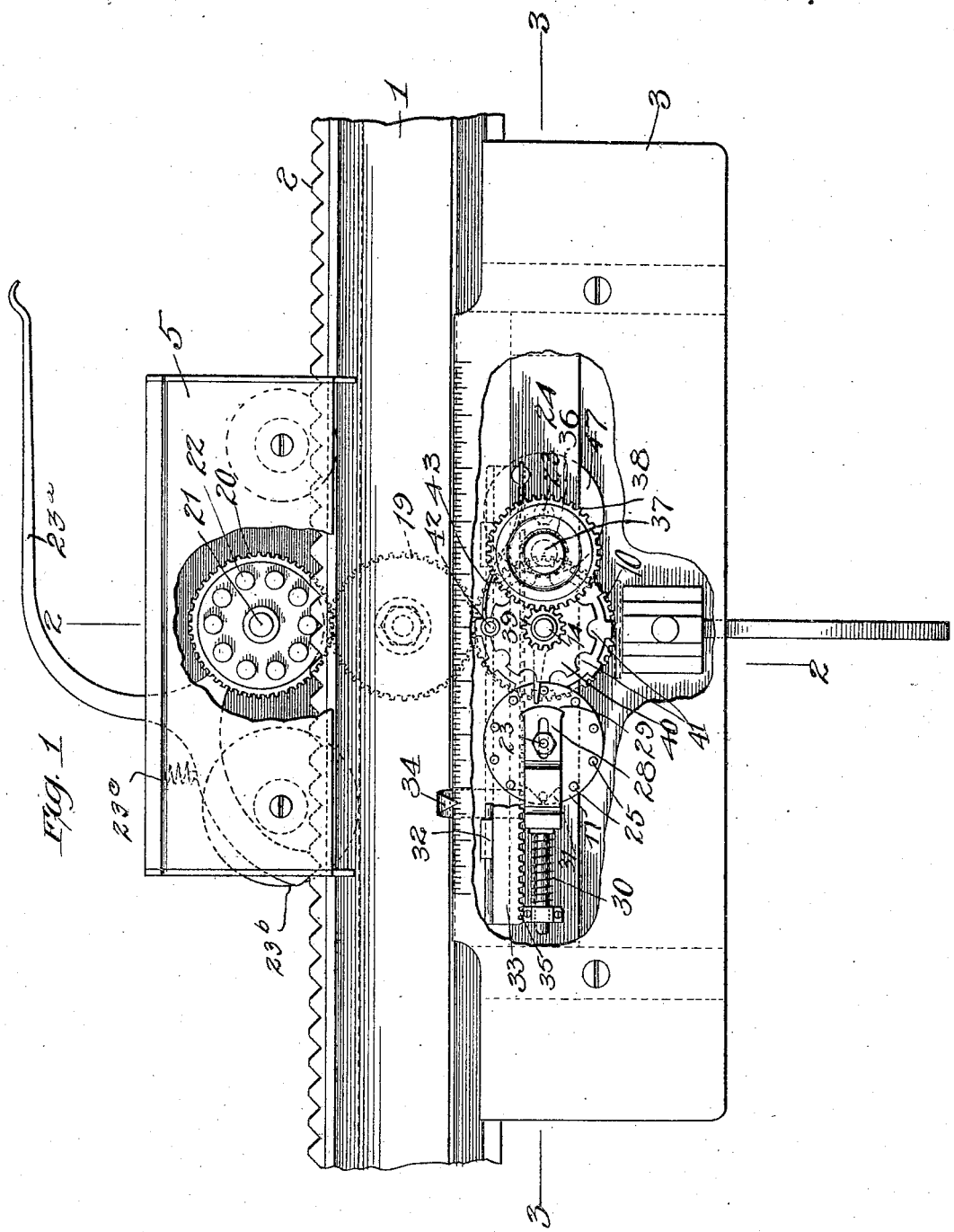

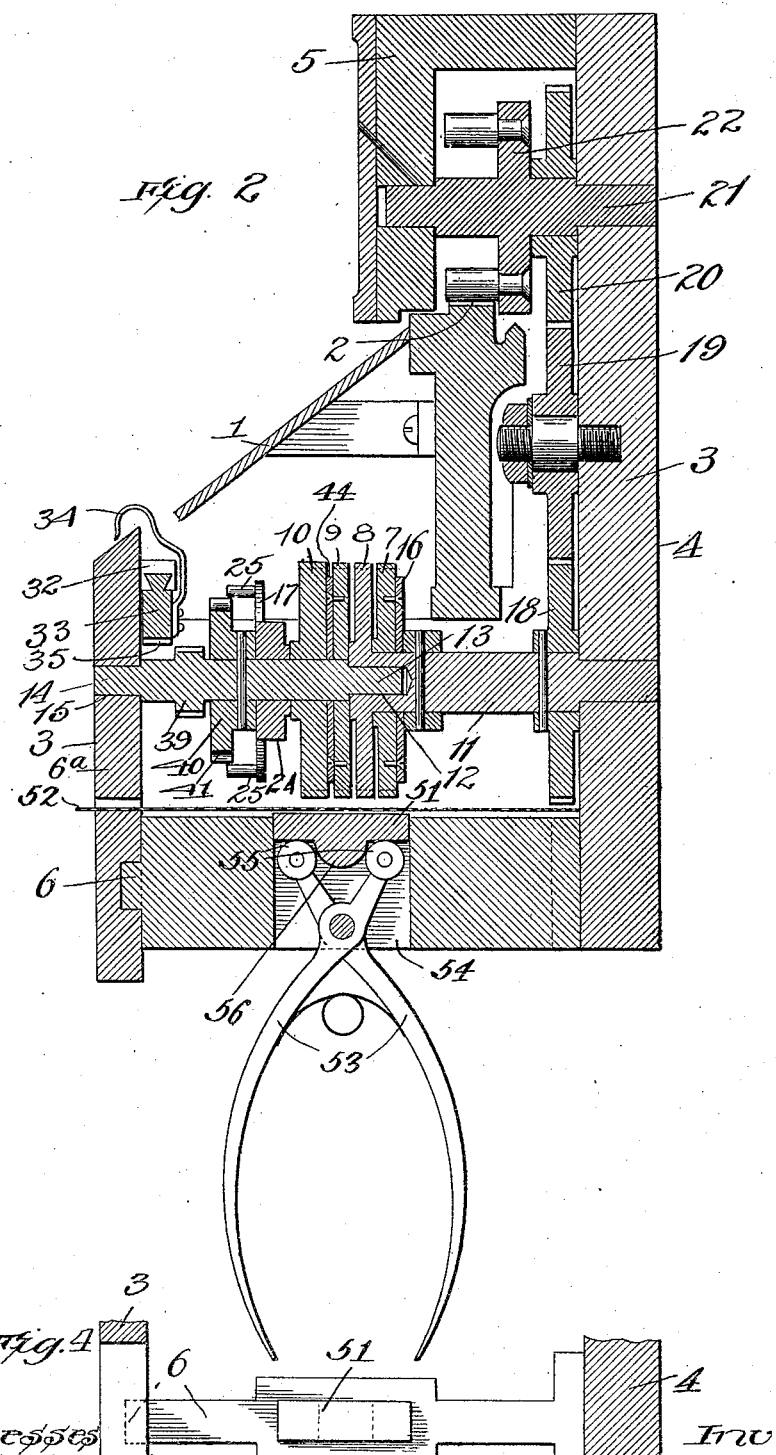
G. GULDBRANDSEN.
WEIGHT RECORDING MEANS FOR WEIGHING SCALES.
APPLICATION FILED APR. 16, 1908.
938,141.
Patented Oct. 26, 1909.
3 SHEETS—SHEET 2.

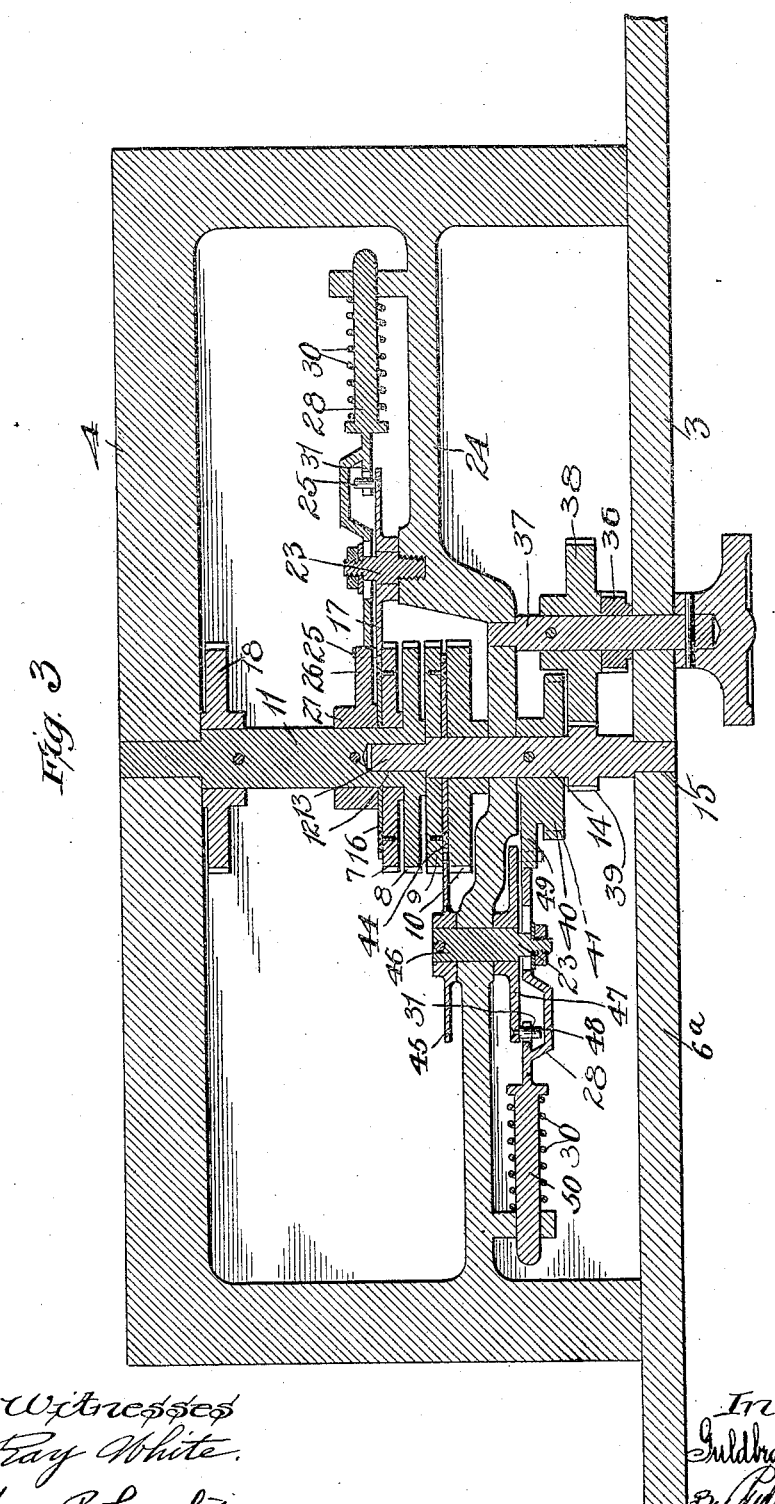

UNITED STATES PATENT OFFICE.

GULDBRAND GULDBRANDSEN, OF TOPEKA, KANSAS.

WEIGHT-RECORDING MEANS FOR WEIGHING-SCALES.

938,141.  Specification of Letters Patent.  Patented Oct. 26, 1909.

Application filed April 16, 1908. Serial No. 427,385.

*To all whom it may concern:*

Be it known that I, GULDBRAND GULDBRANDSEN, subject of the King of Denmark, residing at Topeka, in the county of Topeka and State of Kansas, have invented certain new and useful Improvements in Weight-Recording Means for Weighing-Scales; and I do hereby declare the following to be a full, clear, and exact description of the invention, such as will enable others skilled in the art to which it appertains to make and use the same.

This invention relates to a novel construction in a printing scale beam for beam scales, of the type generally employed by railroads, coal dealers and the like, the object being to provide a simple and efficient device of this character which is accurate, and easily operated and repaired, and consists in the features of construction and combinations of parts hereinafter fully described and claimed.

In the accompanying drawings illustrating my invention: Figure —1— is a fragmentary front elevation of a scale beam and the printing carriage carried thereby, constructed in accordance with my invention, the latter being partly broken away to show interior parts. Fig. —2— is a vertical transverse section on the line 2—2 of Fig. —1—. Fig. —3— is a plan section on the line 3—3 of Fig. —1—. Fig. 4 is a detail fragmentary plan section showing a cross-bar in which the printing plate is movable.

My invention consists in providing a scale beam in which a carriage carrying the printing mechanism is longitudinally movable, the said printing mechanism being partly geared to said scale beam and partly actuated by a hand wheel to correctly indicate and print upon a scale ticket the total weight of the load on the scale platform.

The main object of the invention consists in providing a carriage movable on the scale beam and carrying the printing mechanism and an auxiliary scale beam on which is movable a hand wheel actuated weight, the said printing mechanism being geared partly to the scale beam and actuated partially by the hand wheel to adjust the printing wheels in accordance with and to indicate and print the total weight of the load on the scale platform. The scale beam 1 is provided on its upper edge with a rack 2 and on said scale beam a carriage 3 is movable which serves the same purpose and takes the place of the usual sliding weight employed. Said carriage 3 comprises a plate 4 provided at its upper end with an L shaped flange 5 which overhangs the scale beam, and a plate 6ª opposing the lower end portion of the said plate 4 and secured to the latter by means of cross-bars one of which is shown in Figs. 2 and 4, and indicated by 6.

The number of the printing wheels is varied according to the capacity of the scale, there being four of said wheels where the capacity of the scale does not exceed 100000 pounds and this number being increased or decreased as the capacity increases beyond 100000 pounds or decreases below 10000 pounds. In the instance illustrated the scale is presumed to have capacity of 100000 pounds and accordingly, there are four of said printing wheels 7, 8, 9 and 10 respectively, the wheel 10 carrying the equidistantly disposed ordinals "00"—"10"—"20"—"30"—"40"—"50"—"60"—"70"—"80"—"90"—respectively, and each of the wheels 7, 8 and 9 carrying ordinals ranging consecutively from "0" to "9". The said wheel 8 is rigidly disposed upon the inner end of a shaft 11 journaled in a bearing in the wall 4 of the carriage at one end, and provided with a central recess 12 in its other end in which the reduced inner end portion 13 of the shaft 14 is revoluble, the latter being journaled at its other end in a bearing 15 in the vertical portion of the flange 6. The wheel 7 is loosely disposed on the shaft 11 adjacent said wheel 8 and to the outer face of the same is secured a spur-gear 16 concentric therewith. Said shaft 11 also carries a rigid spur-gear 18 meshing with an idler 19 which in turn meshes with gear 20 rigid on the shaft 21 which also carries the pin gear 22 meshing with the rack 2 of scale beam 1, so that by moving the carriage 3 on the latter, the shaft 11 will obviously be rotated. Gear 22 carries 10 pins each equipped with an anti-friction roller. Meshing with said gear 16 is a spur-gear 17 revolubly disposed on a stud 23 mounted on the longitudinal bar 24 in said carriage 3. Said spur-gear 17 carries ten pins 25 on one face which are adapted to be engaged by the arm 26 of the wheel 27 rigid on said shaft 11 to impart one-tenth of a revolution to said gear 17 and thereby to said gear 16 and wheel 7 during each revolution of said shaft 11.

A plunger 28 provided at one end with a cam face 29 disposed in the path of said arm 26 is reciprocally movable in suitable guides and is normally held at the inner limit of its movement by a spring 30, said plunger being provided between its ends with a bifurcated projection 31 in the recess in which the pins 25 of said gear 17 are successively received and said gear thus held against revolution. Said arm 26 throws said plunger rearwardly to release the gear 17 at the same time that said arm engages one of said pins and rotates said gear.

The divisions of the scale beam 1 are one hundred in number, each division representing one thousand pounds and each tenth division representing ten thousand pounds. The wheels 7 and 8 are so disposed and the gearing so arranged that when the carriage 3 registers with the zero mark of the scale beam, the ordinals of said wheels will be disposed in position to print only zeros on the scale ticket. Upon moving the carriage toward the free end of the scale beam, the wheel will be rotated one-tenth of a revolution for each tooth of the rack 2 passed and through the intermediacy of the wheel 27 and spur-gears 17 and 16 said wheel 7 will be rotated one-tenth of a revolution for each complete revolution of the wheel 8. Thus if the load on the scale platform is 62470 pounds the carriage is moved to the "63000" pounds mark on the scale beam or beyond, and, this being in excess of the load, it is reversed and stopped at the "62000" pounds mark. The ordinal "6" would now be in printing position on the wheel 7 and the ordinal "2" on the wheel 8.

To ascertain the exact weight of the load within a fraction of ten pounds (which is as near as railroad scales, for example, weigh) the wheels 9 and 10 are actuated.

On the upper edge of the vertical portion of flange 6 is a graduated scale having one hundred divisions each representing ten pounds, and slidable in suitable guides 32 is a weight 33 carrying the indicating finger 34 registering on said graduated scale. Said weight 33 is provided on its lower face with a rack 35 which meshes with a pinion 36 on the shaft 37, said pinion having ten teeth and said rack one hundred thereof. Said shaft 37 is journaled in bearings in the vertical portion of said flange 6 and in the longitudinal bar 24 and carries a large spur-gear 38 having one hundred teeth which meshes with the ten toothed pinion 39 rigid with the shaft 14 and with which the wheel 10 is also rigid, the latter being thus turned one-tenth of a revolution for each tooth that said weight 33 is advanced. Said shaft 14 carries a disk 40 rigid therewith, the periphery of which is provided with ten equidistant semi-circular recesses 41 in which the anti-friction roller 42 on the free end of the flat spring 43 is adapted to enter, the latter serving to impart the necessary balance of movement to said disk to complete each one-tenth revolution and thus insuring proper printing position of the wheels 9 and 10 in a well known manner.

The wheel 9 carries the spur-gear 44 meshing with the gear 45 on the shaft 46 on which is the wheel 47 provided on one face with ten pins 48 which are engaged by the arm 49 of the disk 40, the transmission from the wheel 10 to the wheel 9 being thus effected in the same manner as the transmission from the wheel 8 to the wheel 7, the plunger 50 corresponding to the plunger 28 being also employed.

In moving the weight 33 from the zero point on the graduated scale to the 470 pound mark, the wheel 9 would be turned to present ordinal "4" in printing position, and wheel 10 would be turned to present ordinal "70" in printing position. All the ordinals when in printing position face downwardly and oppose a vertically movable plate 51 on which the scale ticket 52 is supported, said plate 51 being adapted to be raised to press said scale ticket against the ordinals by any suitable means, such, for example, as the lazy tong levers 53 pivotally mounted in the slot 54 and carrying anti-friction rollers 55 at one end which engage the projection 56 on the lower face of the plate 51 and serve, when contracted, to force said plate upwardly. For the purpose of inking, a typewriter ribbon may be inserted between the ticket and the printing ordinals, this being omitted from the illustration. The said carriage or poise 3 is moved by means of the operating handle 23ª which is pivotally mounted on the shaft 12 and is equipped with a projection 23ᵇ engaging the rack 2 and normally maintained in engagement therewith by means of the spring 23ᶜ.

My said device is very simple and efficient.

I claim as my invention:

1. In a scale, the combination with the scale beam, equipped with a rack, a poise movable on said scale beam, a plurality of printing wheels carried by said poise, one of the said wheels being geared to said rack, and means operatively transmitting movement from the actuated printing wheel to the remainder thereof at intervals to bring the proper ordinals into alinement to form the number coinciding with the weight indicated on the scale beam with which the poise registers, and locking means actuated by and engaging said transmitting means to lock the said remainder of said printing wheels against movement between the intervals of actuation thereof.

2. In a scale, the combination with the scale beam equipped with a rack, a poise movable on said scale beam, a plurality of printing wheels carried by said poise, one of said wheels being geared to said rack, and means operatively transmitting movement from the actuated printing wheel to the remainder thereof at intervals to bring the proper ordinals into alinement to form the number coinciding with the weight indicated on the scale beam with which the poise registers, a second set of printing wheels carried by said poise, an auxiliary scale beam carried by said poise, an auxiliary poise indicating on said auxiliary scale beam, and operatively geared to one of said printing wheels of said second set, and means similarly transmitting movement from the last named actuated printing wheel to the remainder of the same of the second set, substantially as and for the purposes set forth.

3. In a scale, the combination with the scale beam equipped with a rack, a poise movable on said scale beam, a plurality of printing wheels carried by said poise, one of the said wheels being geared to said rack, and means operatively transmitting movement from the actuated printing wheel to the remainder thereof at intervals to bring the proper ordinals into alinement to form the number coinciding with the weight indicated on the scale beam with which the poise registers, a second set of printing wheels carried by said poise, an auxiliary scale beam carried thereby, an auxiliary poise indicating on said auxiliary scale beam, and operatively geared to one of said printing wheels of said second set, and means similarly transmitting movement from the last named actuated printing wheel to the remainder of the same of the second set, substantially as and for the purposes set forth, and locking means actuated by and engaging said transmitting means to lock the said remainder of said printing wheels against movement between the intervals of actuation thereof.

In testimony whereof, I have signed my name in the presence of two subscribing witnesses.

GULDBRAND GULDBRANDSEN.

Witnesses:
W. B. TROWBRIDGE,
C. R. SMALLEY.